United States Patent [19] [11] 3,774,075
Medesha [45] Nov. 20, 1973

[54] PACKAGE INCLUDING ELECTRICAL EQUIPMENT LEAD SHORTING ELEMENT

[75] Inventor: Alfred L. Medesha, Apache Junction, Ariz.

[73] Assignee: Motorola, Inc., Franklin Park, Ill.

[22] Filed: Sept. 23, 1970

[21] Appl. No.: 74,682

[52] U.S. Cl. ............... 317/2 R, 317/33 SC, 339/19, 206/46 ED, 324/158 F
[51] Int. Cl. ............... H05f 3/00, H02h 7/20
[58] Field of Search ............... 206/46 H, 46 R, 1, 206/46 ED; 317/16, 33 SC, 2 R; 339/19; 324/158 F

[56] References Cited

UNITED STATES PATENTS

| | | | |
|---|---|---|---|
| 3,327,279 | 6/1967 | Lombard | 339/19 |
| 3,441,853 | 4/1969 | Bodine | 324/158 |
| 3,488,620 | 1/1970 | Sullivan et al. | 339/19 |
| 3,417,865 | 12/1968 | Suverkropp | 206/46 H |
| 3,604,557 | 9/1971 | Cedrone | 206/1 R |
| 3,381,080 | 4/1968 | Stelmak | 174/DIG. 3 |

FOREIGN PATENTS OR APPLICATIONS

| | | | |
|---|---|---|---|
| 6,717,270 | 6/1969 | Netherlands | |
| 1,177,899 | 1/1970 | Great Britain | 317/235 B |

OTHER PUBLICATIONS

Transitips, Article in Popular Electronics, April 1967, pp. 85–86.

*Primary Examiner*—Leonard Summer
*Attorney*—Mueller and Aichele

[57] ABSTRACT

Certain types of electrical equipment can be destroyed or seriously damaged by stray fields such as static electricity. A package is provided for storing or shipping such equipment, the package including an element for shorting the leads of the equipment. The shorting element may comprise a waste product of making the electrical equipment. If desired, modified tubular means may be provided for shorting the leads of the equipment.

8 Claims, 11 Drawing Figures

INVENTOR.
Alfred L. Medesha
BY Mueller & Aichele
ATTY'S

INVENTOR.
Alfred L. Medesha
BY
Mueller & Aichele
ATTY'S.

PACKAGE INCLUDING ELECTRICAL EQUIPMENT LEAD SHORTING ELEMENT

BACKGROUND

This invention relates to a package for packaging electrical equipment having leads, said package including lead shorting elements.

Many pieces of electrical equipment having leads comprising a part thereof are sufficiently delicate so that they can be destroyed by stray fields applied to the package or the leads. Among these pieces of electrical equipment may be included MOS transistors. It is not unusual for a piece of equipment including an MOS transistor to test perfectly at the factory and to be inoperative when plugged into the circuit for which it is designed. It is known to short circuit the leads of electrical equipment of this type as soon as tested and to maintain the short circuit until the equipment is delivered to the point where it is to be used. However, short circuiting the leads of such equipment in accordance with prior art devices requires extra steps in the packaging and the provision of specially provided shorting conductors.

It is an object of this invention to provide an improved package for electrical equipment which includes means for shorting the leads thereof.

It is a further object of this invention to provide a package for electrical equipment which includes a lead short circuiting means which is a waste product in the manufacture of the electrical equipment that is placed in the package.

SUMMARY

In accordance with this invention, the waste portion of the lead frame that is cut off from the electrical equipment having a lead frame cooperates with a packaging container in such a manner that the leads of the electrical equipment in the package are short circuited by the waste portion of the frame.

DESCRIPTION

Figure 1:
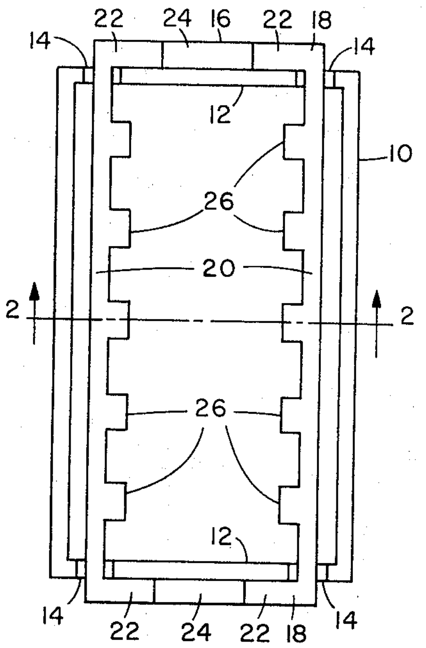
Figure 2:
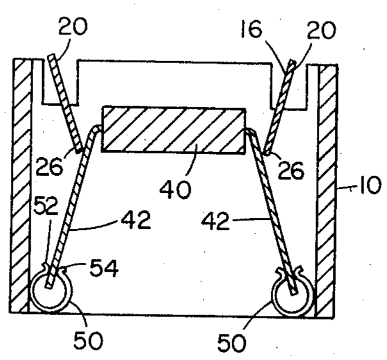
Figure 3:
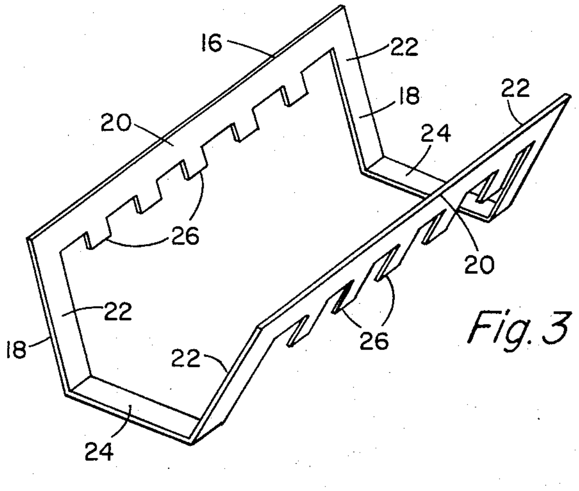
Figure 4:
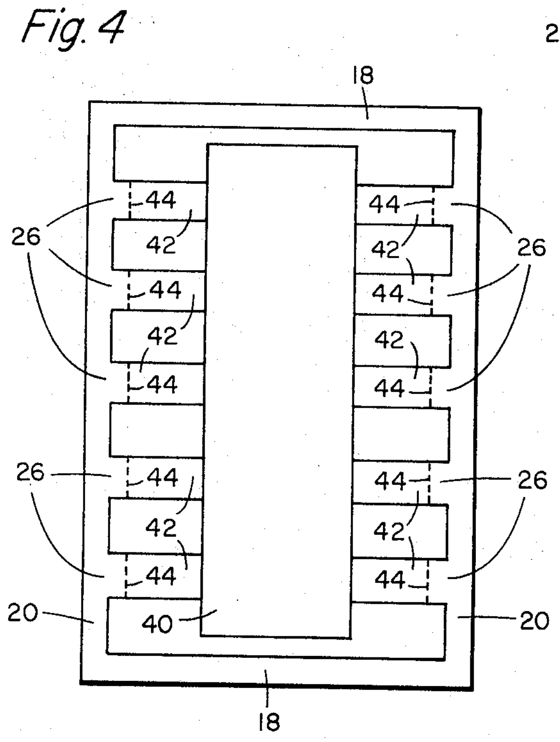
Figure 5:
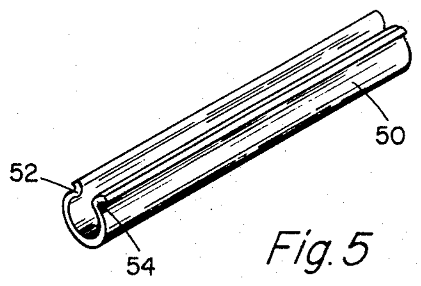
Figure 6:
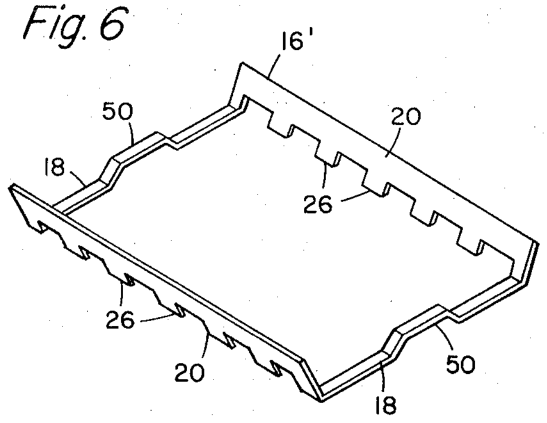
Figure 7:
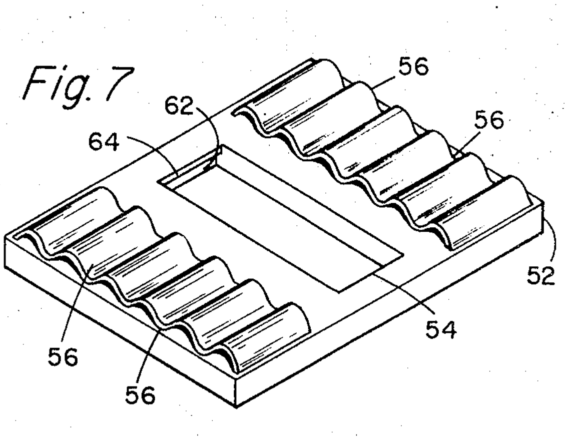
Figure 8:
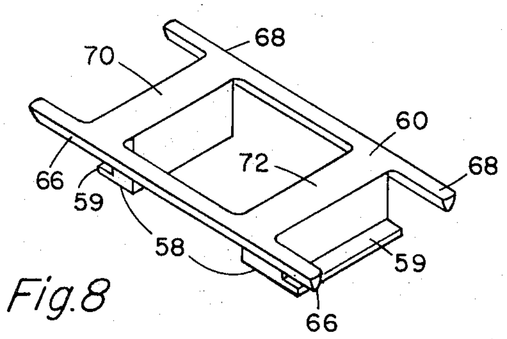
Figure 9:
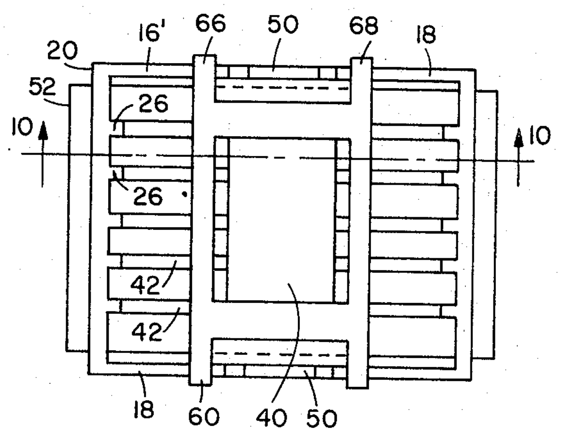
Figure 10:
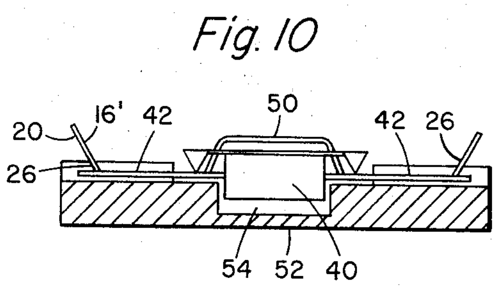
Figure 11:
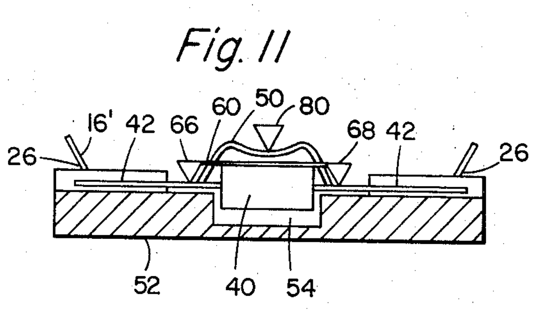

The invention will be better understood when the following description is read in connection with the accompanying drawing in which FIG. 1 is a plan view of a package including a shorting element according to this invention, FIG. 2 is a cross section on the line 2—2 of the package of FIG. 1 showing, however, an integrated circuit having leads disposed in the package, FIG. 3 is an isometric view of the shorting element of FIGS. 1 and 2, FIG. 4 is a plan view of an integrated circuit before the frame is cut away therefrom and showing how the shorting element of FIG. 3 is produced, FIG. 5 is an auxiliary shorting element which may be connected to the leads of the integrated circuit, if desired, FIGS. 6, 7 and 8 are elements of a modified package, FIG. 9 is a plan view of the modified package containing the electrical equipment, and FIGS. 10 and 11 are a sectional view of FIG. 9 on line 10—10 thereof under different conditions.

A first embodiment of the package will first be described in connection with FIGS. 1, 2 and 3. A rectangular frame 10 having parallel walls is provided. This frame is of an insulating plastic and it has no top or bottom. End walls 12 of the frame 10 have notches 14 therein. There are two notches 14 in each end wall 12, these notches extending downwards and these notches being symmetrically placed in the end walls 12 near the side walls of the frame 10. The outside of the frame 10 is shown as smooth, but the outside wall may take any desired shape which may be convenient for handling by machine, for example, such as outstanding flanges (not shown). The frame 10 includes a shorting element 16 which is positioned in the notch 14 of the end walls 12. The end bar portions 18 of the shorting element 16 are outside the frame 10 beyond the end walls 12. The side bars 20 extend into the notches 14 with the tops of the side bars 20 flush with or below the top surface of the end walls 12.

The shape of the portion of a lead frame 16 comprising the shorting element may be noted in FIG. 3. The end portions 18 are bent into a trough shape having downwardly and inwardly slanting sides 22 and bottom bars 24. The side bars 20 include spaced short projections 26 extending downwardly and inwardly for short distances. The side bars 20, the projections 26 and the slanting end portions 22 on one side of the bottom bars 24 are in the same plane and the side bars 20, the projection 26 and the slanting end portions 22 on the other side of the bottom bars 24 are in a different plane.

FIG. 4 shows how, in the finishing steps of making the integrated circuit 40 to be stored in the frame 10, the shorting element or lead frame portion 16 is provided. As is known, the leads 42 are provided as part of a metallic lead frame 16 having end bars 18 and side bars 20, and the inners ends of the leads 42 are connected to bonding pads (not shown) comprising part of the integrated circuit 40. In a later step of the operation, the side bars 20 and the end bars 18 are removed by cutting the leads 42 near the bars 20 as on the dotted line 44. Then the leads 44 are bent downwards to the outwardly slanting shape shown in FIG. 2 and the cut off frame 16 is bent into the trough shape shown in FIG. 3. Then the shorting element 16 is inserted into the frame 10 as shown in FIGS. 1 and 2 and as described hereinabove. The package comprising the frame 10 and the shorting element 16 is now ready to receive the integrated circuit 40 with its bent down leads 42. As shown in FIG. 2, the integrated circuit 40 is inserted into the frame 10 from the side opposite the shorting element 20, with the body of the integrated circuit 40 upwards and with the leads 42 of the integrated circuit 40 extending downwards, this insertion being completed when the leads 42 contact the projections 26 on the shorting element 16. Since the shorting element 16 is produced in a trimming step in the process of making the integrated circuit 40, the projections 26 will register with the leads 42.

It may be desired to short circuit the leads 42 while putting the integrated circuit 40 into the package and after it is taken out of the package, while connecting it into its final position. A tubular short circuiting part 50 shown in FIGS. 2 and 3 may be provided for this purpose. The tube 50 is of a conducting material and it comprises a tube whose periphery is slitted parallel to the axis thereof and the metal at the slit is shaped to provide opposed lips 52 and 54, the lips 52 and 54 being bent back as shown for easy entry thereinto of the ends of the leads 42. Both short circuiting elements are shown in FIG. 2, however, each gives the required lead shorting protection without the other, therefore it is not necessary to use both short circuiting elements.

Another embodiment of the package using the cut off frame 16, which is noted above, is a waste product when making the encapsulated equipment or device 40 of FIGS. 2 to 5, is shown in FIGS. 6 to 11. In accordance with this embodiment, the cut away frame 16' of FIG. 6 is substantially flat except that the side bars 20 slant downward towards each other and the end bars 18 each has a hump 50 centrally positioned along the length thereof, the remainder of the end bars 18, except for the portions thereof comprising parts of the side bars 20 being flat and in the same plane.

A pallet 52 is provided to support the encapsulated device 40 and cooperating with the frame 16' of FIG. 6. The pallet 50 which may be of insulating material, has a rectangular hole 54 therein which is wide enough to receive the body of the device 40, the leads 42 of the device 40 being received in grooves 56 which extend part way along the top surface of the pallet 52. The hole 54 has a longer length than the length of the device 40, to receive locking legs 58 of a retaining device 60 of FIGS. 8 to 11. The ends of the hole 54 are shaped to provide a space 62 (only one of which is shown in FIG. 7) to receive the ends 59 of the locking legs 58, the legs being held in place by a shelf 64 comprising part of the pallet 52, as will be further explained. The grooves 56 extend towards each other but end to leave spaces to receive parts of the retainer 60 as will be explained.

The retainer 60 has parallel side legs 66 and 68 which may be triangular in form, the apex of the triangle extending downwards as viewed in FIG. 8. The side legs are joined by cross bars 70 and 72 which extend only part way along the lengths of the side legs 66 and 68, leaving the legs as shown and also leaving a hole between the side legs and between the cross bars. No hole may be provided if desired. The locking legs 58 extend downwardly from the cross bars 70 and 72 and the ends 59 of the legs 58 extend away from each other and in the same plane.

In using the package of FIGS. 6 to 11, the device 40 in its flat shape as shown in FIG. 4 but without the frame portion 16, is laid in the hole 54 with the leads 42 in respective grooves 56. The frame 16' is laid out on the pallet 52 in such a manner that the projections 26 on the frame 16' contact respective leads 42. The end bars 18 extend along the sides of the pallet as shown in FIG. 9. Then the retainer 60 is so pushed into the pallet 52 that the ends 59 of the legs 58 are received in the space 62 under the shelves 64. The ends of the legs 66, 68 contact the end bars 18 of the frame 16' and hold it in place on the pallet 52. The legs 66 and 68 contact the tops of the leads 42 whereby the frame 16' is held in place. Since each of the leads 42 is contacted by a projection 26 of the leads 16', the leads 42 are all short circuited when the device 40 is so held in the pallet 52.

If it is desired to test the device 40 without removing it from the package comprising the pallet 52 and the retainer 60, the middle of the humped up portion 50 of the frame 16' is pressed down, as by a traingular tool 80 whereby the frame 16' bends, as shown in FIG. 11, to raise the projections 26 above the leads 42, whereby the device 40 is no longer short circuited. The device 40 is still securely held in the pallet 52 but the leads 42 thereof may be connected for test purposes. When the test is completed, the tool 80 may be removed, restoring the short circuit for the leads, or the retainer 60 may be pulled away from the pallet 52 to free the frame 16' and the device 40 may be removed from the pallet to be connected in a circuit as desired.

What is claimed is:

1. A lead short circuiting package for electrical equipment having a plurality of leads extending from each of opposite sides thereof, the leads on each of said sides being in the same plane, said package including in combination:

a rectangular frame of insulating material having first and second side walls and first and second end walls defining a substantially rectangular opening for receiving electrical equipment having a plurality of co-planar leads extending from each of opposite sides thereof; and, metallic conductor means of substantially rectangular configuration carried by and supported on said frame and extending along both of said side walls for contacting and electrically interconnecting co-planar leads on opposite sides of electrical equipment when such equipment is positioned within said frame.

2. The invention of claim 1 wherein said conductor means is trough shaped for engaging co-planar leads on opposite sides of electrical equipment.

3. The invention of claim 2 wherein said conductor means comprises the trimmed away frame for the leads of an integrated circuit package.

4. The invention of claim 1 in which there are two notches in each end wall of said frame and said cpnductor means is shaped to extend along one side wall from one notch in one end wall to a corresponding notch in the other end wall and through the other notch in said other end wall and along said other side wall to the other notch in said one end wall.

5. The invention of claim 4 in which said conductor means extends through said notches beyond the walls of said frame and along said side end walls outside of said frame.

6. The invention of claim 5 in which said conductor means is trough shaped, whereby said portions of said conductor that are in said notches are in planes which slant towards each other and at angles with the planes of said side walls.

7. The invention of claim 6 wherein said trough shaped conductor means comprises the trimmed away frame for leads of an integrated circuit package.

8. A lead short circuit package according to claim 1 wherein said rectangular frame is a pallet of plastic material having a hole at least part way through said pallet to define said side and end walls and providing an opening, portions of the surface of said pallet adjacent each of said side walls adapted for supporting co-planar leads on opposite sides of electrical equipment received in the opening, said conductor means having projections positioned to engage leads on said pallet at said portions of the surface thereof, and a retainer having locking legs extending into the hole and holding said conductor means and said projections against leads supported on said portions of the surface of said pallet, end walls of said pallet on opposite sides of the hole being formed to cooperate with the locking legs of said retainer to hold said retainer in place.

* * * * *